(12) United States Patent
Lee et al.

(10) Patent No.: US 7,381,236 B2
(45) Date of Patent: Jun. 3, 2008

(54) CYCLONE DUST-SEPARATING APPARATUS

(75) Inventors: Hyun-Ju Lee, Jeonrabuk-Do (KR);
Hwa-Gyu Song, Jeonrabuk-Do (KR);
Jong-Kook Lim, Gwangju (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 527 days.

(21) Appl. No.: 11/072,386

(22) Filed: Mar. 4, 2005

(65) Prior Publication Data
US 2006/0080947 A1 Apr. 20, 2006

(30) Foreign Application Priority Data
Oct. 14, 2004 (KR) .................. 10-2004-0082107

(51) Int. Cl.
*B01D 45/12* (2006.01)

(52) U.S. Cl. .................. 55/426; 55/459.1; 55/DIG. 3

(58) Field of Classification Search .................. 55/424, 55/426, 429, 459.1, DIG. 3; 15/350, 353
See application file for complete search history.

(56) References Cited

U.S. PATENT DOCUMENTS

| 6,398,834 | B2 * | 6/2002 | Oh .................. 55/424 |
| 6,432,154 | B2 | 8/2002 | Oh et al. .................. 55/423 |
| 2002/0011052 | A1 | 1/2002 | Oh et al. .................. 55/424 |
| 2002/0011053 | A1 | 1/2002 | Oh .................. 55/426 |
| 2004/0237482 | A1 | 12/2004 | Lim et al. .................. 55/337 |

FOREIGN PATENT DOCUMENTS

| DE | 9403305.6 | 2/1994 |
| DE | 203 06 405 | 10/2003 |
| DE | 102 48 087 | 4/2004 |
| FR | 2874315 | 2/2006 |
| GB | 2364940 | 2/2002 |
| GB | 2384452 | 7/2003 |
| JP | 2001-029289 | 2/2001 |
| JP | 2002-051947 | 2/2002 |
| JP | 2002-051951 | 2/2002 |
| JP | 2003-180569 | 7/2003 |
| JP | 2003-190058 | 7/2003 |

OTHER PUBLICATIONS

Russian Office Action dated Dec. 19, 2005 from corresponding Russian Appln. 2005109377 filed Mar. 25, 2005.

(Continued)

*Primary Examiner*—Robert A Hopkins
(74) *Attorney, Agent, or Firm*—Ohlandt, Greeley, Ruggiero & Perle, LLP.

(57) ABSTRACT

A cyclone dust collector comprises a cyclone body including a cyclone chamber, a connection path and a dust chamber, wherein the cyclone chamber and the dust chamber are arranged in parallel, a cover unit connected to an upper part of the cyclone body and having a suction path for external air to flow in therethrough, and a backflow prevention member disposed at one sidewall of the dust chamber to prevent collected dust from flowing to the cyclone chamber.

11 Claims, 4 Drawing Sheets

OTHER PUBLICATIONS

Search Report dated Mar. 23, 2006 issued from the European Patent Office with respect to European Patent Application No. 05290543.7 filed on Mar. 10, 2005.

Official Action dated Dec. 14, 2005 issued from the Korean Intellectual Property Office with respect to Korean Patent Application No. 2004-82107 filed on Oct. 14, 2004.

Office Action dated Nov. 10, 2006 issued from the Chinese Patent Office with respect to Chinese Patent Application No. 200510054798.9 filed on Mar. 16, 2005 (w/English translation).

Office Action dated Aug. 28, 2007 corresponding to Japanese Patent Application No. 2005-48324.

* cited by examiner

CYCLONE DUST-SEPARATING APPARATUS

CROSS-REFERENCE TO RELATED APPLICATIONS

This application claims the benefit of Korean Patent Application No. 2004-82107, filed Oct. 4, 2004, in the Korean Intellectual Property Office, the disclosure of which is incorporated herein by reference.

BACKGROUND OF THE INVENTION

1. Field of the Invention

The present invention relates to a vacuum cleaner. More particularly, the present invention relates to a cyclone dust collector for centrifugally separating dust from drawn-in air.

2. Description of the Related Art

Generally, a cyclone dust collector comprises a cyclone body having a cyclone chamber and a dust chamber. With the above structure, dust-laden air drawn into the cyclone body is divided into a clean air and dust by a centrifugal force in the cyclone chamber, and the dust separated from the dust-laden air is collected in the dust chamber.

The cyclone chamber and the dust chamber may be arranged vertically in a serial manner or in parallel, in the cyclone body.

A Korean Patent No. 2001-009957 (filed by L G Electronics Co., Ltd) discloses an exemplary cyclone dust collector vacuum cleaner wherein the dust chamber is disposed under the cyclone body in a serial manner. A Japanese Patent No. 2001-029289 discloses a cyclone dust collector having a cylindrical dust collector and a removable dust chamber dust chamber mounted on a part of a circumference of the dust collector.

Especially, when the cyclone chamber and the dust chamber are disposed in parallel, height of the cyclone dust collector can be reduced, and accordingly, applicability of the cyclone dust collector to a small-sized domestic vacuum cleaner is enhanced. However, in such a structure where the cyclone chamber and the dust chamber are arranged in parallel, the dust moves from the cyclone chamber to the dust chamber through a connection path formed therebetween. Therefore, backflow of the collected dust from the dust chamber toward the cyclone chamber needs to be prevented.

SUMMARY OF THE INVENTION

An aspect of the present invention is to solve at least the above problems and/or disadvantages and to provide at least the advantages described below. Accordingly, an aspect of the present invention is to provide a cyclone dust collector having a compact size, which is able to effectively prevent backflow of collected dust.

In order to achieve the above-described aspects of the present invention, there is provided a cyclone dust collector comprising a cyclone body including a cyclone chamber, a connection path and a dust chamber, wherein the cyclone chamber and the dust chamber are arranged in parallel, a cover unit connected to an upper part of the cyclone body and having a suction path for external air to flow in therethrough, and a backflow prevention member disposed at one sidewall of the dust chamber to prevent collected dust from flowing to the cyclone chamber.

The backflow prevention member is mounted at a right wall of the dust chamber, which is a partition between the dust chamber and the connection path. The backflow prevention member covers approximately 30 to 50% (percent) of a top area of the dust chamber.

The backflow prevention member is inclined toward a bottom of the dust chamber, having a substantially arc-shaped section.

A first length of the backflow prevention member and a secondlength of the dust chamber are substantially in the ratio of 0.8:1 to 0.9:1, and a first width of the backflow prevention member and a second width of the dust chamber are substantially in the ratio of 0.4:1 to 0.5:1.

BRIEF DESCRIPTION OF THE DRAWING FIGURES

The above aspect and other features of the present invention will become more apparent by describing in detail exemplary embodiments thereof with reference to the attached drawing figures, wherein.

DETAILED DESCRIPTION OF THE EXEMPLARY EMBODIMENTS

Figure 1:
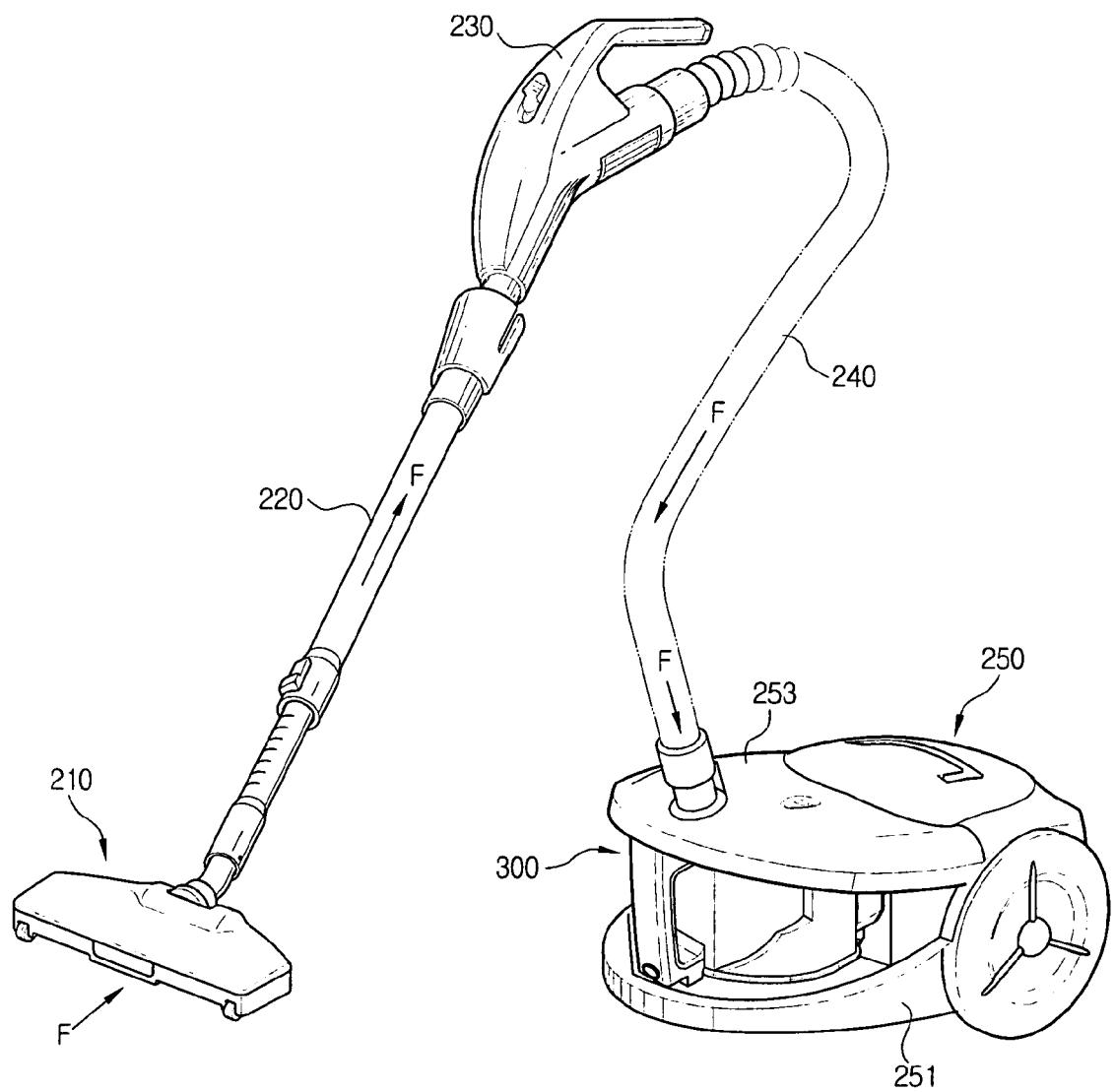
FIG. 1 is a perspective view of a vacuum cleaner having a cyclone dust collector according to an embodiment of the present invention.

Hereinafter, an embodiment of the present invention will be described in detail with reference to the accompanying drawing figures.

In the following description, same drawing reference numerals are used for the same elements even in different drawings. The matters defined in the description such as a detailed construction and elements are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

FIG. 1 shows a vacuum cleaner 200 adopting a cyclone dust collector 300 according to an embodiment of the present invention. The vacuum cleaner 200 comprises a cleaner body 250, a suction brush 210 for drawing in dust on a surface being cleaned, an operation part 230 for operating the vacuum cleaner 200, an extension pipe 220 connecting the suction brush 210 and the operation part 230, a flexible hose 240 connecting the operation part 230 and the cleaner body 250, and the cyclone dust collector 300.

A driving motor (not shown) for supplying a suction force is mounted in the cleaner body 250. For this, the cleaner body 250 includes a driving chamber (not shown) for mounting the driving motor (not shown) and a dust chamber 251 connected to the driving chamber (not shown). In the dust chamber 251, the cyclone dust collector 300 is removably mounted to centrifugally separate dust from drawn-in air.

Figure 2:
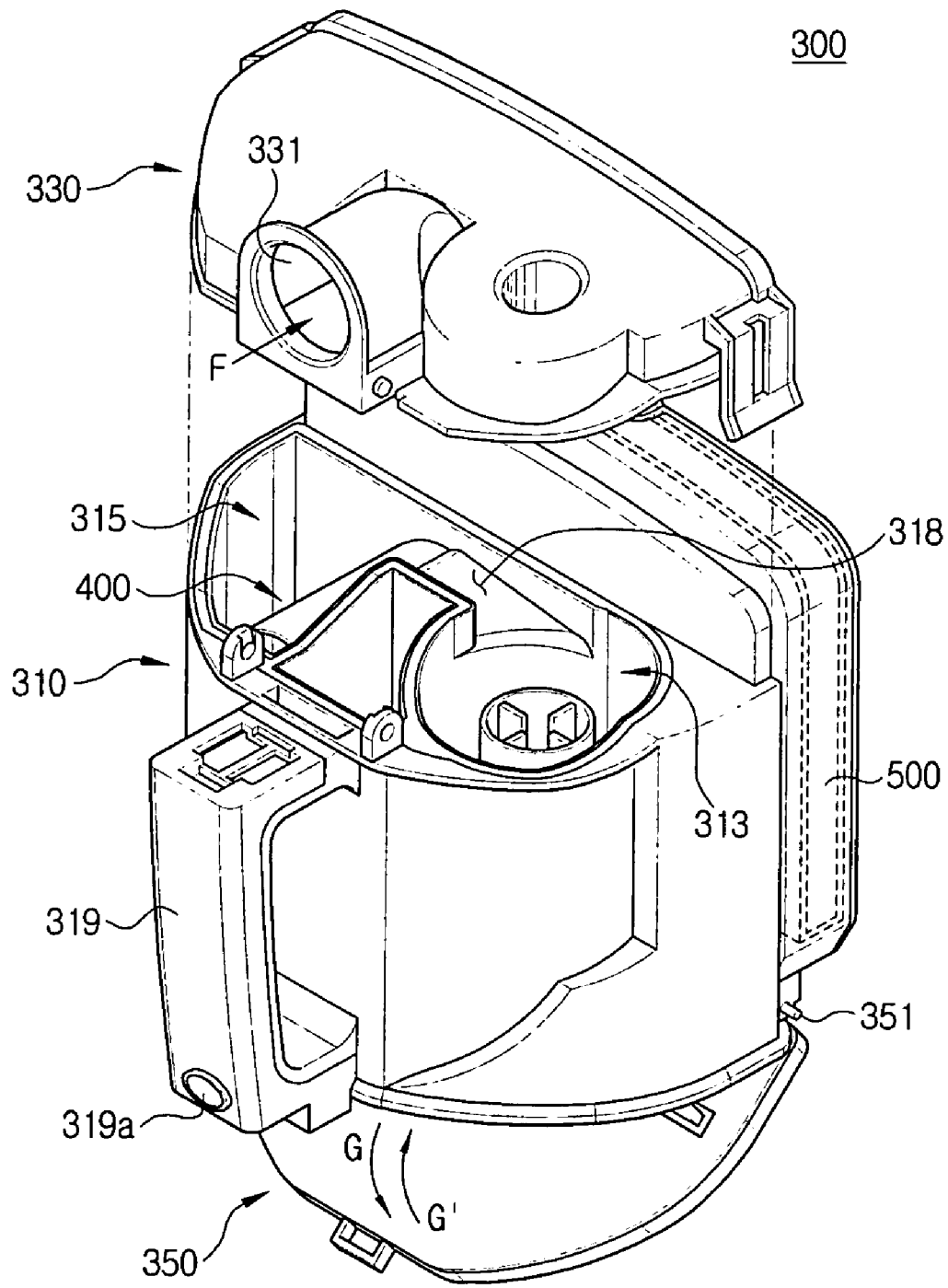
FIG. 2 is an exploded perspective view of the cyclone dust collector of FIG. 1.

Referring to FIG. 2, the cyclone dust collector 300 comprises a cover unit 330, a door unit 350 and a cyclone body 310.

The cover unit 330 is removably mounted at an upper part of the cyclone body 310. As the cover unit 330 is mounted to the upper part of the cyclone body 310, a dust moving path 318 is naturally formed between a cyclone chamber 313 and a dust chamber 315. Through the dust moving path 318, the dust separated from dust-laden air in the cyclone chamber 313 moves into the dust chamber 315.

When the cover unit 330 is detached from the cyclone body 310, access of a user to the cyclone chamber 313 and the dust chamber 315 becomes available for cleaning and repairing.

A suction path 331 is formed in the middle of the cover unit 330. The suction path 331 is fluidly communicated with the flexible hose 240 (FIG. 1).

The door unit 350 is hinged to a lower part of the cyclone body 310 to open in an arrow G direction and close in an arrow G' direction with respect to a hinge 351. By opening the door unit 350, a bottom surface of a connection path 311 (FIG. 3) and the dust chamber 315 is opened, and accordingly, the dust collected in the connection path 311 (FIG. 3) and the dust chamber 315 falls to be discharged.

In order to open the door unit 350, a button 319a formed at a handle 319 is pressed to thereby depress a hook (not shown) connected to one side of the door unit 350. Accordingly, connection between the door unit 350 and the hook (not shown) is released, and therefore, the door unit 350 is opened as the other side thereof rotates with respect to the hinge 351.

To close the door unit 350, the user has to forcibly rotate the door unit 350 with respect to the hinge 351 in the G' direction, such that the one side of the door unit 350 is fastened with the hook (not shown).

Figure 3:
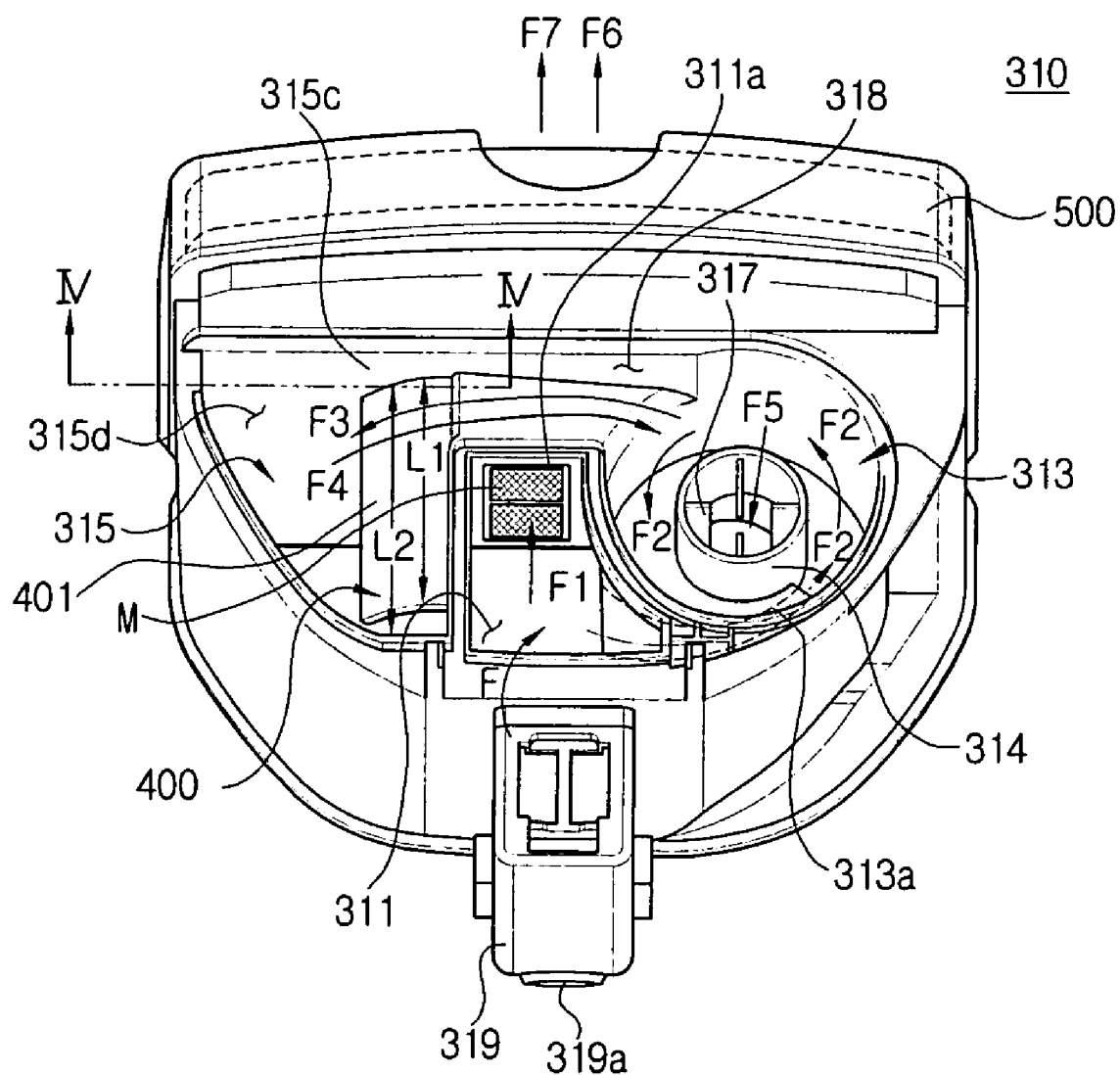
FIG. 3 is a perspective view of a cyclone body of FIG. 2.

Referring to FIG. 3, the cyclone body 310 comprises the handle 319, the connection path 311, the cyclone chamber 313, and the dust chamber 315.

The handle 319 substantially has a flattened U shape, and is mounted on a front of the cyclone body 310 to be grabbed by the user when separating the cyclone body 310 from the cleaner body 250. The handle 319 includes the button 319a for opening the door unit 350 at a lower part thereof, and a link member (not shown) for connecting the button 319a and the hook (not shown) therein.

The connection path 311 is formed in the middle of the cyclone body 310 and fluidly communicated with the suction path 331 (FIG. 2) so as to guide the dust-laden air drawn into the suction path 331 (FIG. 2) toward the cyclone chamber 313. In the connection path 311, a mesh hole 311a is formed to mount a mesh filter M capable of filtering fine dust. The connection path 311 is fluidly communicated with the driving motor (not shown) through the mesh filter M. The bottom of the connection path 311 is opened as opening the door unit 350, thereby discharging the dust collected on the bottom of the connection path 311.

The cyclone chamber 313 is disposed on the right with respect to the connection path 311 in the cyclone body 310, referring to FIG. 2, to centrifugally separate the dust from the dust-laden air.

On a bottom surface of the cyclone chamber 313, an entering path 313a and a discharge path 314 are formed. The air drawn in through the suction path 331 (FIG. 2) and the connection path 311 flows into the cyclone chamber 313 through the entering path 313a, and the centrifuged air is discharged through the discharge path 314.

The discharge path 314 for discharging the centrifuged air has a substantially circular section and a predetermined height from a mid-bottom in the cyclone chamber 313. The discharge path 314 may be formed integrally with or separately from the cyclone chamber 313.

The discharge path 314 has four ribs 317 for reducing noise and loss of pressure which are generated when the air is discharged through the discharge path 314.

The dust chamber 315 is formed on the left with respect to the connection path 311 within the cyclone body 310 to collect the dust separated at the cyclone chamber 313.

A bottom of the dust chamber 315 is opened by opening the door unit 350, such that the dust collected on the bottom of the dust chamber 315 can be discharged.

Figure 4:
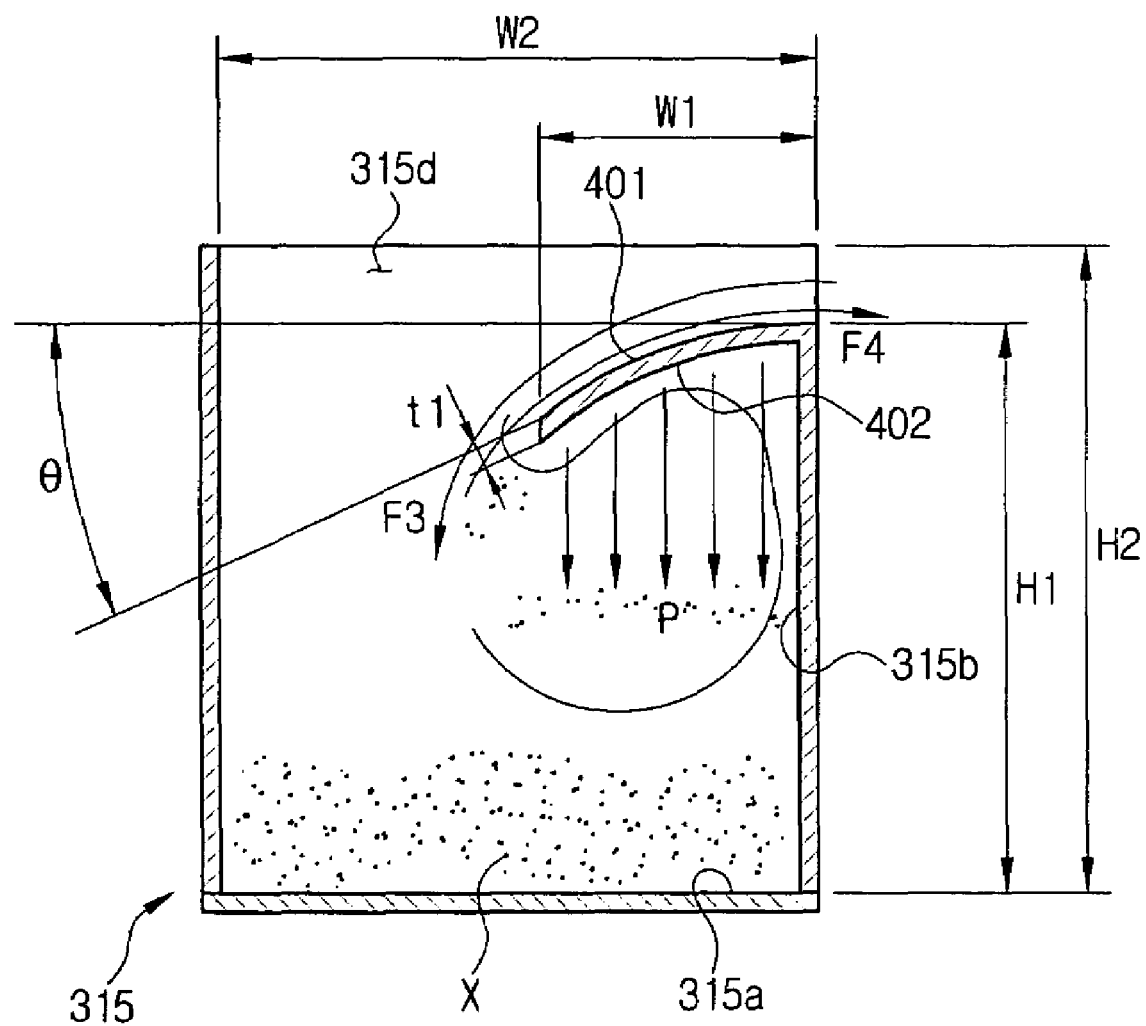
FIG. 4 is a sectional view of a cyclone chamber cut away along a line IV-IV of FIG. 3.

Referring to FIGS. 3 and 4, a backflow prevention member 400 is mounted in the dust chamber 315 to prevent the separated and collected dust X from flowing back to the cyclone chamber 313.

The backflow prevention member 400 has a substantially arc-shaped section. The backflow prevention member 400 is made of the same material as the cyclone body 310, such as transparent acryl, having a length L1, a width W1 and a thickness t1.

The length L1 and the width W1 of the backflow prevention member 400 are properly determined so as to prevent the dust collected in the dust chamber 315 from flowing back to the cyclone chamber 313.

The length L1 of the backflow prevention member and a length L2 of the dust chamber are substantially in the ratio of 0.8:1 to 0.9:1. The width W1 of the backflow prevention member and a width W2 of the dust chamber are substantially in the ratio of 0.4:1 to 0.5:1.

With the above-structured length L1 and width W1, the backflow prevention member 400 covers approximately 30~50% of a top area 315d of the dust chamber 315.

Further, the backflow prevention member 400 is attached on a right wall 315b and a rear wall 315c of the dust chamber 315 by welding or by an adhesive to be inclined toward the bottom 315a of the dust chamber 315 by an angle θ.

Here, a height H1 for mounting the backflow prevention member 400 and a height H2 of the dust chamber 315 are preferably in the ratio of 0.8:1 to 0.9:1.

The angle θ is approximately 20° to 25°, such that the dust, as flowing into the dust chamber 315 in an arrowed direction F3, can overcome friction with an upper surface 401 of the backflow prevention member 400 and fall to the bottom 315a of the dust chamber 315.

Hereinbelow, the operation of the vacuum cleaner having the structure as shown in FIGS. 1 to 4 will be described.

Referring to FIGS. 1 and 2, as the driving motor (not shown) generates the suction force, the suction force is transmitted to the suction brush 210 through the cyclone dust collector 300. The suction brush 210 draws in dust-laden air on a surface being cleaned. The drawn-in air enters the suction path 331 of the cover unit 330, passing through the suction brush 210, the extension pipe 220 and the flexible hose 240 in an arrowed direction F.

Referring to FIG. 3, a part of the drawn-in air is passed through the mesh filter M disposed in the mesh hole 311a, in the connection path 311, in an arrowed direction F1, and is discharged out of the cyclone dust collector 300 through a discharge filter 500 formed at a rear side of the cyclone body 310, in an arrowed direction F7. The rest part of the drawn-in air flows into the entering path 313a of the cyclone chamber 313 in an arrowed direction F2.

The drawn-in air, while rotating, rises from the bottom of the cyclone chamber 313 up to an upper part (not shown) of the cover unit 330. During this, the dust is bounced out to the dust chamber 315 formed on the left of the cyclone body 310 in the arrowed direction F3 by a centrifugal force.

Dust-separated air collides with the upper part (not shown) of the cover unit 330, descends in an arrowed direction F5, and is discharged out of the discharge path 314 formed on the center of the cyclone chamber 313.

The air discharged out of the discharge path 314 is discharged to the outside of the cyclone dust collector 300 through the discharge filter 500 formed at the rear side of the cyclone body 310, in an arrowed direction F6.

Meanwhile, the air which entered the connection path 311 is mostly discharged through the mesh filter M mounted in the mesh hole 311a at the beginning of driving of the vacuum cleaner. However, when the mesh filter M is stuffed by dust or foreign substances, most of the air flows to the entering path 313a of the cyclone chamber 313 because fluid such as air is apt to move to a side having a relatively lower resistance. By existence of the mesh filter M, loss of pressure can be reduced when the vacuum cleaner is initially driven.

Referring to FIGS. 3 and 4, the dust bounced out to the dust chamber 315 moves in the arrowed direction F3 along the dust moving path 318 and the upper surface 401 of the backflow prevention member 400 and falls on the bottom 315a of the dust chamber 315.

The dust-separated air moves along a lower surface 402 and the upper surface 401 of the backflow prevention member 400 in an arrowed direction F4 and enters the cyclone chamber 313. At this time, the dust collected in the dust chamber 315 may flow back to the cyclone chamber 313.

This is because the cyclone chamber 313 and the dust chamber 315 become closer to each other due to the parallel arrangement, compared to when they are serially arranged.

Also, since capacity of the dust chamber 315 is relatively small, the dust easily fills the dust chamber 315, piling up near the cyclone chamber 313.

The backflow of the dust occurs very often especially when the dust chamber 315 is full of the dust.

However, by the backflow prevention member 400 mounted in the dust chamber 315, the dust in the dust chamber 315 can be prevented from flowing back to the cyclone chamber 313.

More specifically, the dust, flowing back to the cyclone chamber 313 in the arrowed direction F4, is collided with the lower surface 402 of the backflow prevention member 400.

By an impact with the lower surface 402 during this, the dust falls in an arrowed direction P, thereby being recollected in the dust chamber 315. Accordingly, the backflow of the dust from the dust chamber 315 to the cyclone chamber 313 is restrained.

As can be appreciated from the above description of a cyclone dust collector and a vacuum cleaner having the same, according to embodiments of the present invention, although the cyclone chamber 313 and the dust chamber 315 are disposed in parallel with each other, the backflow prevention member 400 can restrain the collected dust from being flowing back to the cyclone chamber 313. As a result, deterioration of suction efficiency, caused by the dust blocking the discharge path 314 and the discharge filter 500, can be prevented.

While the invention has been shown and described with reference to certain embodiments thereof, it will be understood by those skilled in the art that various changes in form and details may be made therein without departing from the spirit and scope of the invention as defined by the appended claims.

What is claimed is:

1. A cyclone dust collector comprising:
a cyclone body including a cyclone chamber, a connection path, and a dust chamber, wherein the cyclone chamber and the dust chamber are arranged in parallel;
a cover unit connected to an upper part of the cyclone body and having a suction path for external air to flow therethrough; and
a backflow prevention member disposed at one sidewall of the dust chamber to prevent collected dust from flowing to the cyclone chamber,
wherein the backflow prevention member covers a top area of the dust chamber, and
wherein the backflow prevention member is inclined toward a bottom of the dust chamber.

2. The cyclone dust collector of claim 1, wherein the backflow prevention member is mounted at a right wall of the dust chamber as a partition between the dust chamber and the connection path.

3. The cyclone dust collector of claim 2, wherein the backflow prevention member covers approximately 30 to 50% of the top area of the dust chamber.

4. The cyclone dust collector of claim 3, wherein the backflow prevention member has a substantially arc-shaped section.

5. The cyclone dust collector of claim 4, wherein the backflow prevention member has a first length and the dust chamber has a second length, the first and second lengths being substantially in the ratio of 0.8:1 to 0.9:1, and wherein the backflow prevention member has a first width and the dust chamber has a second width, the first and second widths being substantially in the ratio of 0.4:1 to 0.5:1.

6. A vacuum cleaner comprising:
a cyclone chamber having an upper part;
a dust chamber arranged in parallel with the cyclone chamber;
a cover unit having a suction path for external air, the cover unit being connected to the upper part; and
a backflow prevention member disposed at a sidewall of the dust chamber to prevent collected dust in the dust chamber from flowing to the cyclone chamber,
wherein the backflow prevention member covers a top area of the dust chamber, and
wherein the backflow prevention member is inclined toward a bottom of the dust chamber.

7. The vacuum cleaner of claim 6, wherein the backflow prevention member covers approximately 30 to 50% of the top area of the dust chamber.

8. The vacuum cleaner of claim 6, wherein the backflow prevention member has a substantially arc-shaped section.

9. The vacuum cleaner of claim 6, wherein the backflow prevention member has a first length and the dust chamber has a second length, the first and second lengths being substantially in the ratio of 0.8:1 to 0.9:1.

10. The vacuum cleaner of claim 6, wherein the backflow prevention member has a first width and the dust chamber has a second width, the first and second widths being substantially in the ratio of 0.4:1 to 0.5:1.

11. The vacuum cleaner of claim 6, wherein the backflow prevention member is inclined toward a bottom of the dust chamber by an angle of approximately 20° to 25°.

* * * * *